(12) United States Patent
Fukutomi

(10) Patent No.: US 8,432,593 B2
(45) Date of Patent: Apr. 30, 2013

(54) OPTICAL SCANNING APPARATUS AND IMAGE FORMING APPARATUS USING THE SAME

(75) Inventor: Akihiro Fukutomi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/652,648

(22) Filed: Jan. 5, 2010

(65) Prior Publication Data

US 2010/0172005 A1 Jul. 8, 2010

(30) Foreign Application Priority Data

Jan. 6, 2009 (JP) ................................ 2009-000835

(51) Int. Cl.
*G02B 26/08* (2006.01)

(52) U.S. Cl.
USPC .................. 359/199.3; 359/199.1; 359/200.7; 359/215.1

(58) Field of Classification Search .... 359/199.1–199.4, 359/213.1–215.1, 225.1, 226.2, 200.7
See application file for complete search history.

(56) References Cited

U.S. PATENT DOCUMENTS

| | | | | |
|---|---|---|---|---|
| 4,370,019 A | * | 1/1983 | Shirasaki | ................... 359/199.1 |
| 2006/0152785 A1 | | 7/2006 | Yasuda | |

FOREIGN PATENT DOCUMENTS

| | | |
|---|---|---|
| JP | 07-299928 A | 11/1995 |
| JP | 09-80348 A | 3/1997 |
| JP | 2005-208578 A | 8/2005 |
| JP | 2008-070398 A | 3/2008 |

* cited by examiner

*Primary Examiner* — James Phan
(74) *Attorney, Agent, or Firm* — Canon USA, Inc. IP Division

(57) ABSTRACT

An optical scanning apparatus includes a plate member, having a rotation axis and a reflection surface, that deflects and scans a laser beam emitted from a light source by performing reciprocating-rotation around the rotation axis, an actuator configured to drive the plate member, an fθ-lens configured to focus the laser beam deflected by the plate member on a surface of a photosensitive drum, and an optical box configured to house the plate member, the actuator, and the fθ-lens. The actuator is provided nearer to a side of the optical box toward which the laser beam is reflected by the reflection surface than the reflection surface of the plate member is.

16 Claims, 13 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus for use in an image forming apparatus, such as a copying machine, a facsimile machine, and a laser beam printer. More particularly, the present invention relates to an optical scanning apparatus for performing deflection scanning of a laser beam using a deflection mirror (microelectromechanical system (MEMS) mirror) manufactured using MEMS technology.

2. Description of the Related Art

In recent years, there has been a demand for further reduction in the sizes of electrophotographic image forming apparatuses, such as copying machines and laser beam printers for use in offices, especially, of a compact desktop image forming apparatus.

Japanese Patent Application Laid-Open No. 7-299928 discusses a small laser beam printer that employs an S-shaped path as a recording medium conveying path. With such a configuration, all of sheet-feeding, image-forming, fixing, and sheet-discharging operations can be performed within the installation area of the body of the printer.

On the other hand, various optical scanning apparatuses each including a light deflection device, which employs an MEMS mirror, have been proposed. The optical scanning apparatuses each including a light deflection device employing an MEMS mirror, have a feature that the light deflection device itself can considerably be reduced in size, as compared with an optical scanning apparatus using a rotatable polygonal mirror.

In addition, the optical scanning apparatuses using a light deflection device employing an MEMS mirror also have features that power consumption is low and that a silicon single-crystal MEMS mirror manufactured by a semiconductor process is theoretically metal-fatigueless and excels in durability.

Japanese Patent Application Laid-Open No. 9-80348 discusses a technology of performing optical scanning utilizing a reflection mirror that performs sine vibrations in a light deflection device using an MEMS mirror. Japanese Patent Application Laid-Open No. 2005-208578 discusses a technology of simultaneously exciting two or more natural vibration modes in a torsional vibration direction to perform optical scanning other than the optical scanning by sine vibrations.

To further reduce the installation area of an image forming apparatus, it is necessary not only to devise the conveying path but also to further miniaturize various components provided in the image forming apparatus.

More specifically, the optical scanning apparatus should be installed so as not to interfere with a locus of a process cartridge during the attachment/detachment of the process cartridge by a user, while the optical scanning apparatus is disposed close to the process cartridge in order to irradiate laser light onto a photosensitive member of the process cartridge.

Accordingly, it is requested to further reduce the size of the optical scanning apparatus itself.

SUMMARY OF THE INVENTION

The present invention is directed to a miniaturized optical scanning apparatus and to an image forming apparatus including the optical scanning apparatus.

According to an aspect of the present invention, an optical scanning apparatus includes a light source configured to emit laser light, a movable device having a rotation axis and a reflection surface on which the laser light is incident, the movable device configured so that the reflection surface performs reciprocating-rotation around the rotation axis, an actuator that causes the reflection surface to perform the reciprocating-turns, a scanning lens configured to converge the laser light reflected by the reflection surface on a scanned surface, and an optical box configured to house the movable device, the actuator, and the scanning lens. The scanned surface is scanned with the laser light reflected by the reflection surface, which performs the reciprocating-rotation. The actuator is disposed nearer to a side of the optical box toward which the laser light is reflected by the reflection surface than the reflection surface of the movable device is.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

However, the dimensions, materials, shapes, relative arrangements of components described in the following description of the exemplary embodiments can appropriately be changed according to apparatuses and various conditions, to which the present invention is applied. Accordingly, the scope of the present invention is not limited to the following exemplary embodiments.

An image forming apparatus having an optical scanning apparatus according to a first exemplary embodiment, to which the present invention can be applied, is described below. In the following description, first, an image forming apparatus having an optical scanning apparatus according to the present exemplary embodiment is exemplified. Then, an optical scanning apparatus included in the image forming apparatus is described in detail.

Figure 13:
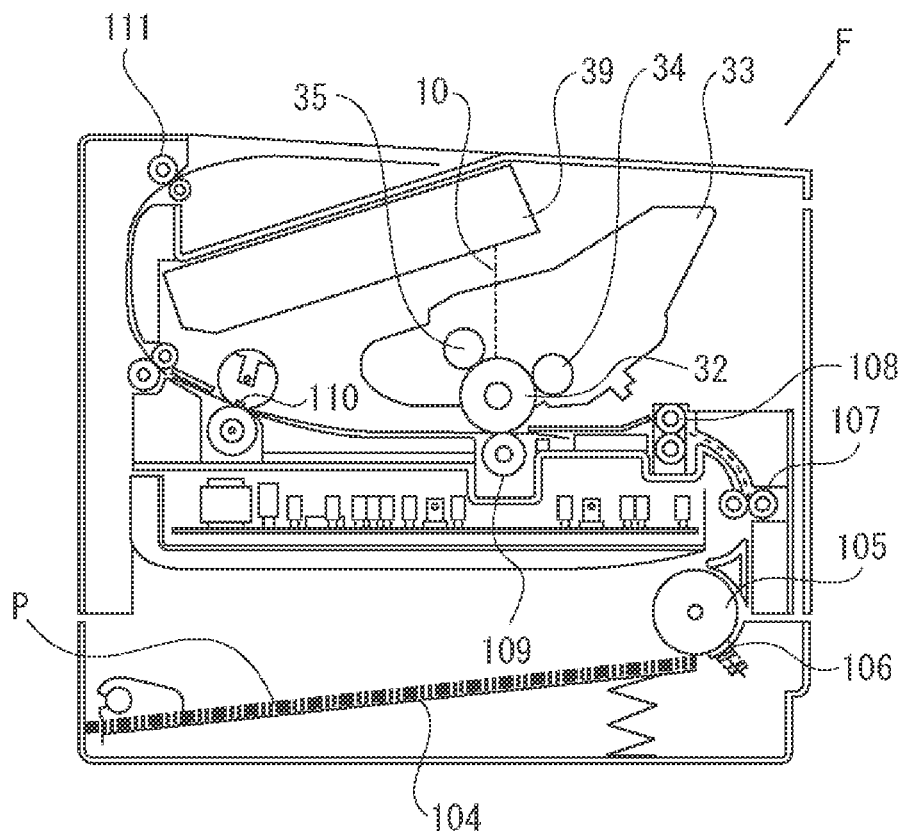
FIG. 13 is a schematic cross-sectional view illustrating an image forming apparatus according to the first exemplary embodiment of the present invention.

First, the image forming apparatus including the optical scanning apparatus according to the first exemplary embodiment is exemplified and described with reference to FIG. 13. FIG. 13 is a schematic cross-sectional view illustrating the image forming apparatus according to the first exemplary embodiment.

The image forming apparatus according to the present exemplary embodiment includes the optical scanning apparatus described below. An image bearing member is scanned with a light flux emitted from the optical scanning apparatus. The image forming apparatus has an image forming unit that forms an image on a recording material, such as a sheet, based on a scanned image. Hereinafter, a printer is exemplified as the image forming apparatus.

As illustrated in FIG. 13, the image forming apparatus (printer) is configured so that a laser beam 10 is emitted, based on the obtained image information, from an optical scanning apparatus 39 and irradiated onto a scanned surface of a photosensitive drum (photosensitive member included in a process cartridge 33) 32.

Then, a latent image is formed on the scanning surface of the photosensitive drum 32. The latent image is affixed with toner by a development roller (i.e., development unit in the process cartridge 33) 34. The process cartridge 33 integrally includes the photosensitive drum 32, and a charging roller (charging unit) 35 and the development roller 34, which serve as a processing unit acting upon the photosensitive drum 32.

The process cartridge 33 can be attached to and detached from an apparatus body in the direction of arrow F by opening an upper cover of the apparatus body.

On the other hand, recording media P stacked on a recording medium loading plate 104 are separated one by one by a feed roller 105 and a separation pad 106. Then, the recording medium P is conveyed to further a downstream side by intermediate rollers 107 and conveying rollers 108.

A toner image formed on a surface of the photosensitive drum 32 is transferred onto the conveyed recording medium P by a transfer roller 109. The recording medium P on which the toner image is transferred is conveyed to further a downstream side. The toner image is fixed onto the recording medium P by a fixing device 110 having a heating element provided therein. Then, the recording medium P is discharged outside by discharge rollers 111.

Although the present embodiment integrally has the charging unit and the development unit, which act upon the photosensitive drum 32 and serve as a processing unit, and the photosensitive drum 32 in the process cartridge 33, each processing unit can be constructed separately from the photosensitive drum 32.

Figure 1:
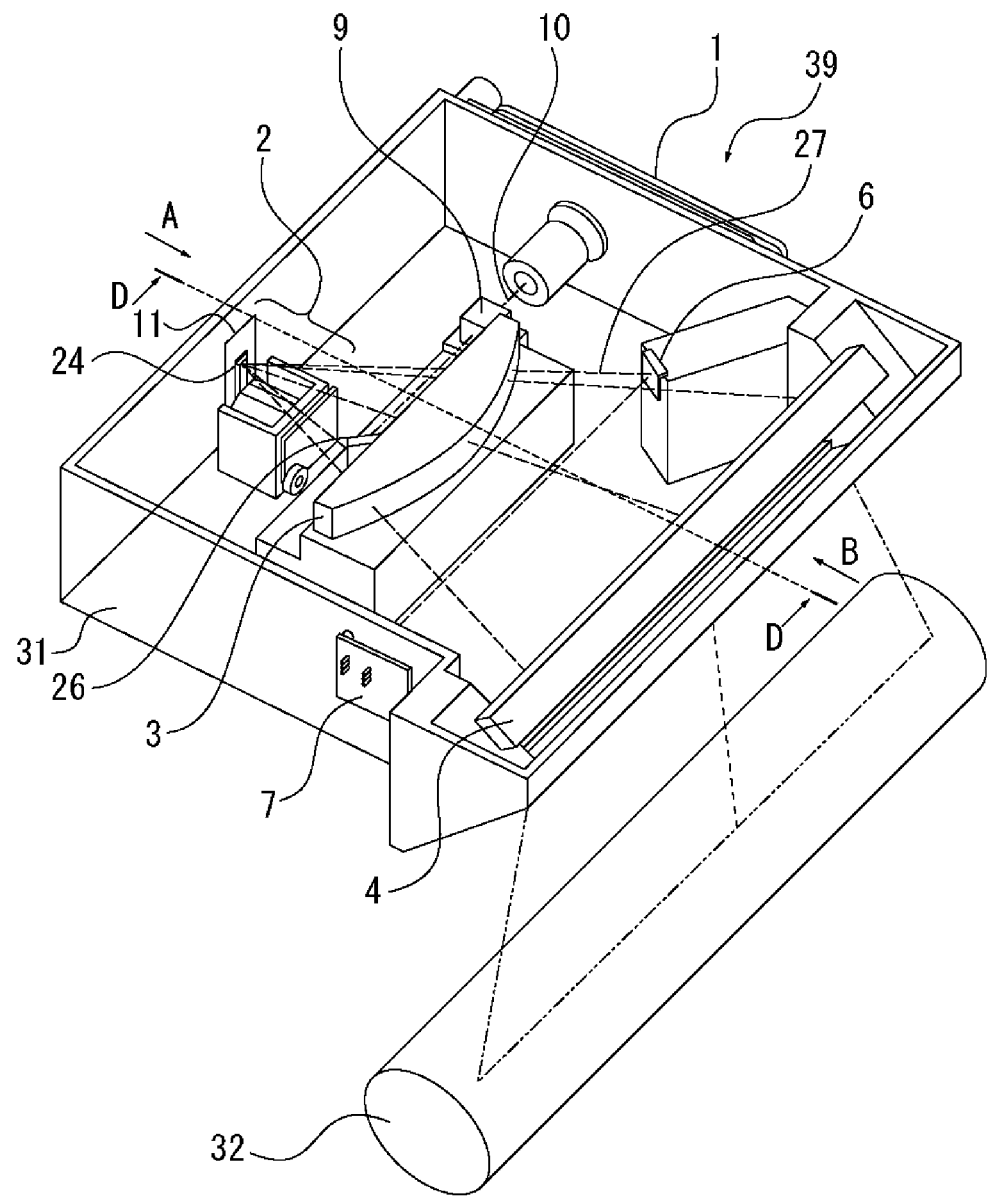
FIG. 1 is a perspective view illustrating an optical scanning apparatus according to a first exemplary embodiment of the present invention.

Next, the optical scanning apparatus provided in the image forming apparatus according to the first exemplary embodiment is described below with reference to FIG. 1. FIG. 1 is a perspective view illustrating the configuration of the optical scanning apparatus 39 according to the first exemplary embodiment.

The laser beam 10 emitted from a light source apparatus 1 passes through a cylindrical lens 9. Thereafter, an angle of the laser beam 10 is changed by a reflection mirror 26. Then, the deflection scanning of the laser beam 10 is performed by a light deflection device 2 described below. The laser beam 10 undergoing the deflection scanning performed by the light deflection device 2 passes through an fθ-lens (scanning lens) 3. Then, the laser beam 10 is reflected by a reflection mirror 4. Thereafter, the laser beam 10 reaches a surface of the photosensitive drum 32. The expression "the deflection scanning of the laser beam 10 is performed by the light deflection device 2" means that a beam-spot, into which the laser beam 10 is converged, is moved in the direction of an axis thereof (i.e., a main scanning direction) on the surface (scanned surface) of the photosensitive drum 32. The term "sub-scan" means that the beam-spot of the scanning beam is relatively moved on the surface of the photosensitive drum 32 in a direction perpendicular to the main scanning direction (i.e., sub-scanning direction). A desired latent image is formed on the surface of the photosensitive drum 32 by relatively moving the beam-spot of the laser beam with respect to the surface of the photosensitive drum 32 in the main scanning direction and the sub-scanning direction.

The laser beam 10 is converged into a beam-spot by the fθ-lens 3 so that the beam-spot is obtained by optimally converging the laser beam (scanning beam) 10 and that the beam-spot is moved in the main scanning direction within a width in the longitudinal direction of the photosensitive drum 32.

A laser beam 27 (part of the laser beam 10 undergoing the deflection scanning performed by the light deflection device 2) is reflected by a reflection mirror (i.e., pre-light-receiving-sensor mirror) 6 and introduced to a detection surface of a light receiving sensor 7.

Based on an output signal of the light receiving sensor 7, which represents a result of detection by the sensor 7, a control operation of synchronizing a write signal for each scanning line therewith is performed. Thus, a write position, at which the laser beam is written, for each scanning line is prevented from being deviated.

The laser beam 10 is compressed by a cylindrical lens 9 in a direction corresponding to the sub-scan direction on a reflection surface (i.e., deflection surface of the light deflection device 2) 24 to form a linear image. Thus, a laser beam irradiation position in the sub-scanning direction on the photosensitive drum 32 is prevented from being deviated due to a tilt error of the reflection surface 24.

In addition, an optical system between the reflection surface 24 and the surface of the photosensitive drum 32 is configured such that the reflection surface 24 and the photosensitive drum 32 are conjugate with each other in the direction corresponding to the sub-scanning direction.

The light deflection device 2 and the optical elements, such as the fθ-lens 3 and the reflection mirror 4, are housed in a resin optical box 31. An upper opening of the optical box 31 is covered by a lid member (not illustrated).

Figure 2A:
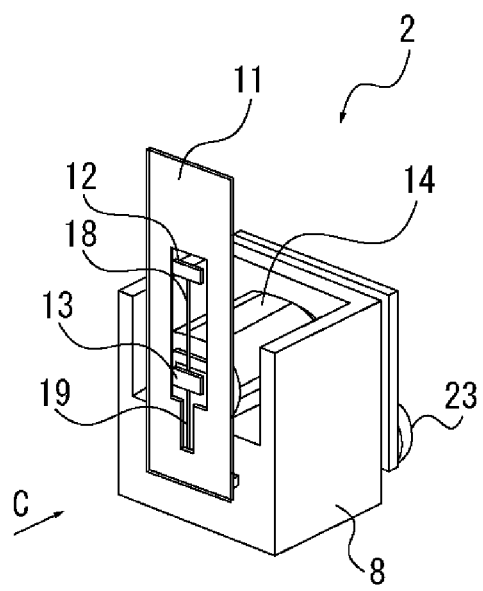
FIGS. 2A and 2B are perspective views illustrating a light deflection device according to the first exemplary embodiment of the present invention.
Figure 2B:
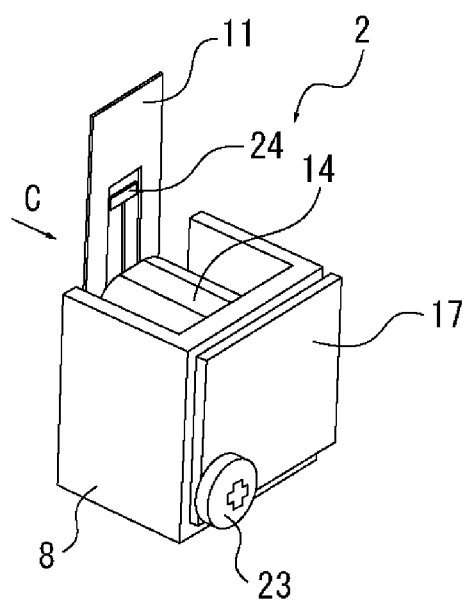
Figure 3:
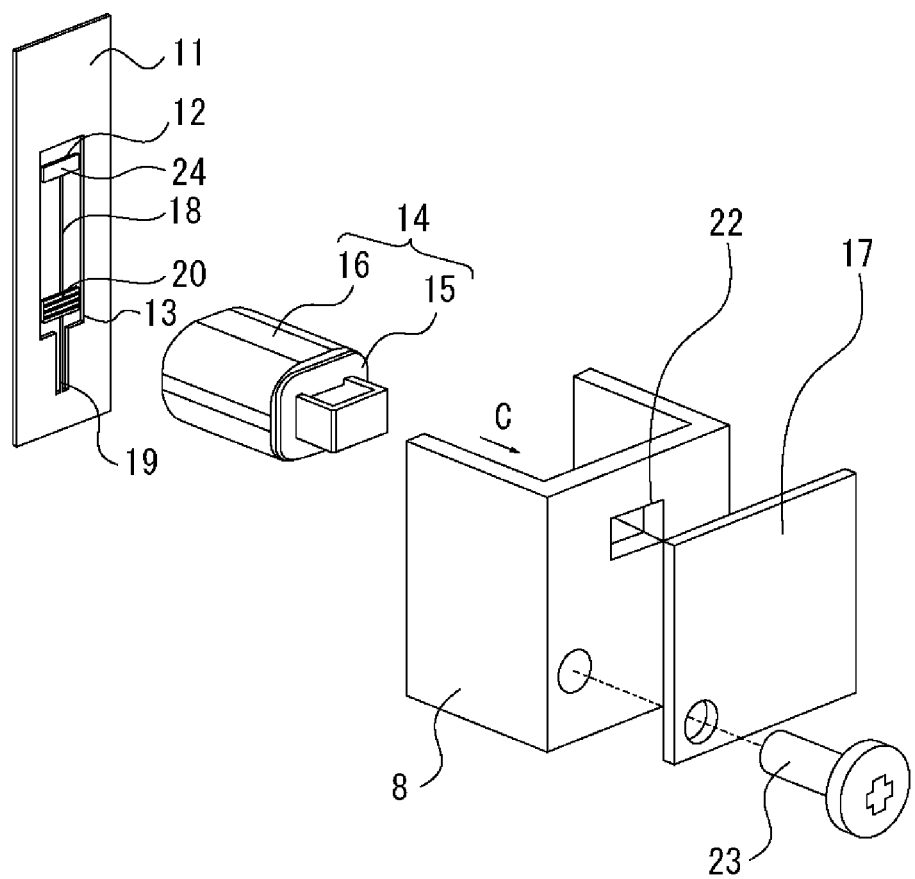
FIG. 3 is an exploded perspective view illustrating the light deflection device according to the first exemplary embodiment of the present invention.

Next, the light deflection device 2 is described below. FIGS. 2A and 2B are perspective views illustrating the light deflection device 2. FIG. 2A is a perspective view seen from the direction of arrow A illustrated in FIG. 1. FIG. 2B is a perspective view seen from the direction of arrow B illustrated in FIG. 1. FIG. 3 is an exploded perspective view illustrating the light deflection device 2.

As illustrated in FIG. 3, the actuator 14 includes an iron core 15 and a winding 16 wound around the iron core. The actuator 14 is inserted into a holder (holding member) 8 from the direction of arrow C. Thus, the actuator 14 is fit into a hole 22 and positioned at and fixed to the holder 8.

A circuit board 17 for supplying electric power to the actuator 14 is fixed to the holder 8 with a screw 23. The circuit board 17 is electrically connected to a control circuit (not illustrated) equipped in the image forming apparatus.

The plate member (i.e., movable device (deflection device)) 11 is fixed to the holder 8 after the actuator 14 is fixed to the holder 8. The plate member 11 is manufactured by performing etching on a silicon (Si) monocrystal wafer. The plate member 11 includes two movable elements (i.e., a reflection element 12 and a drive element 13).

The movable elements 12 and 13 are connected by a torsion spring 18 to each other. The movable element 13 and a support frame are connected by a torsion spring 19. The movable element (reflection element) 12 located upward in the direction corresponding to the sub-scanning direction (i.e., in the direction of the rotation axis) protrudes upward in the sub-scanning direction from the uppermost portion of the actuator 14.

Aluminum is vapor-deposited on the reflection surface 24 of the movable element (reflection element) 12. Thus, a reflection film suitable for reflecting the laser beam is formed thereon. A bar-like permanent magnet (drive portion) 20 is integrally fixed to the other movable element (drive element) 13, which is positioned under the movable element 12 in the sub-scanning direction, and constitutes a magnetic circuit together with the actuator 14 that faces the magnet 20.

The actuator 14 and the permanent magnet 20 constitute a drive unit that drives the movable element (drive element) 13 of the plate member 11 by supplying a driving force to the movable element 13. Each of the movable elements 12 and 13 is driven by applying electric-current to the winding (coil) 16 wound around the iron core 15.

That is, the plate member 11 is a reciprocating-rotation movable device (deflection device) that has a rotation axis and a reflection surface and that performs the deflection scanning of the laser beam 10 by performing the reciprocating-rotation of the reflection surface around the rotation axis.

The plate member 11 has a plurality of natural vibration modes serving as the oscillation modes of an oscillation (turn) element. More specifically, the plate member 11 according to the present exemplary embodiment has a fundamental natural vibration mode of a fundamental frequency corresponding to a scanning period, and at least another natural vibration mode of a frequency that is twice the frequency of the fundamental frequency. Each of the movable elements 12 and 13 is driven by the superposition of such natural vibration modes.

Figure 4:
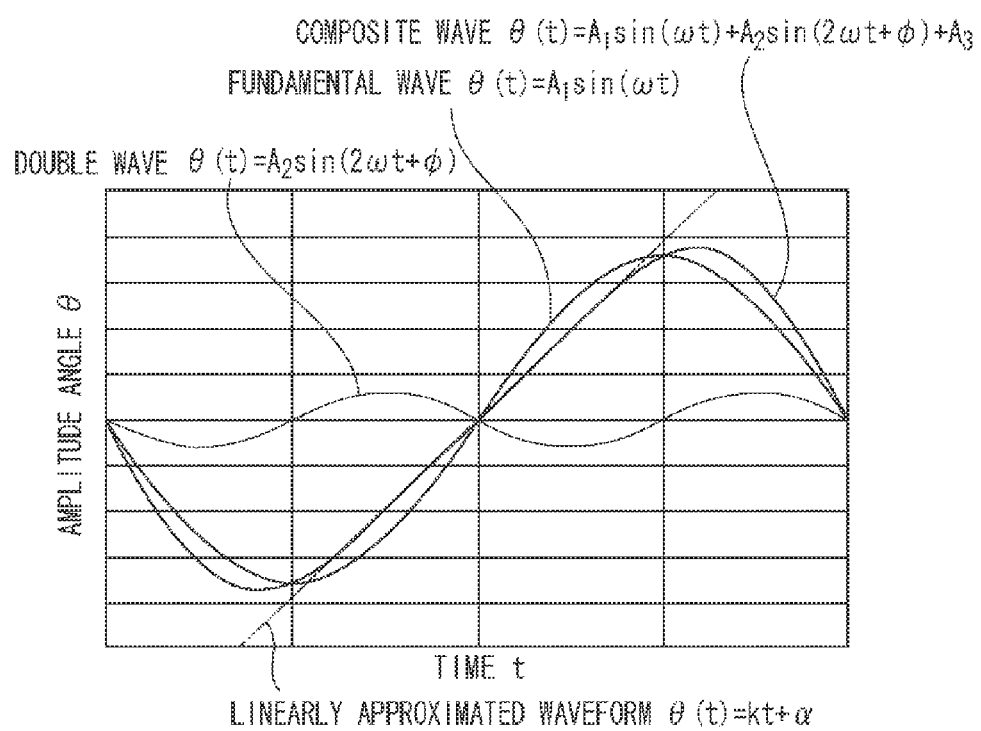
FIG. 4 is a graph illustrating temporal change of an amplitude of a movable element of the light deflection device according to the first exemplary embodiment of the present invention.

Next, the superposition of a plurality of natural vibration modes respectively having the natural frequencies (i.e., the fundamental natural frequency and the second natural frequency) is described below with reference to FIG. 4.

The amplitude angle θ(t) of the movable element (reflection element) 12 used to perform the deflection scanning of the laser beam approximately shows behavior represented by the following expression with respect to time t.

$$\theta(t) = A_1 \sin(\omega t) + A_2 \sin(2\omega t + \phi) + A_3$$

where $A_1$ is an amplitude corresponding to the fundamental natural frequency (of a fundamental wave), $A_2$ is amplitude corresponding to the second natural frequency (of a double wave), $\omega$ is the fundamental natural frequency, $\phi$ is the phase difference between the fundamental wave and the double wave, and $A_3$ is a static angular error (e.g., an angular error in the position of the movable element 12 when the movable element 12 does not vibrate). In the case of an example illustrated in FIG. 4, $\phi=0$ and $A_3=0$.

The amplitude angle θ(t) can approximately be represented as the following expression within a specific range of one period by appropriately setting each parameter.

$$\theta(t) \approx kt + \alpha$$

where k and α are constants.

In this range, the movable element (reflection element) 12 vibrates substantially at uniform angular velocity. Thus, the deflection scanning of the laser beam incident upon the movable element (reflection element) 12 is performed substantially at uniform angular velocity.

Figure 5:
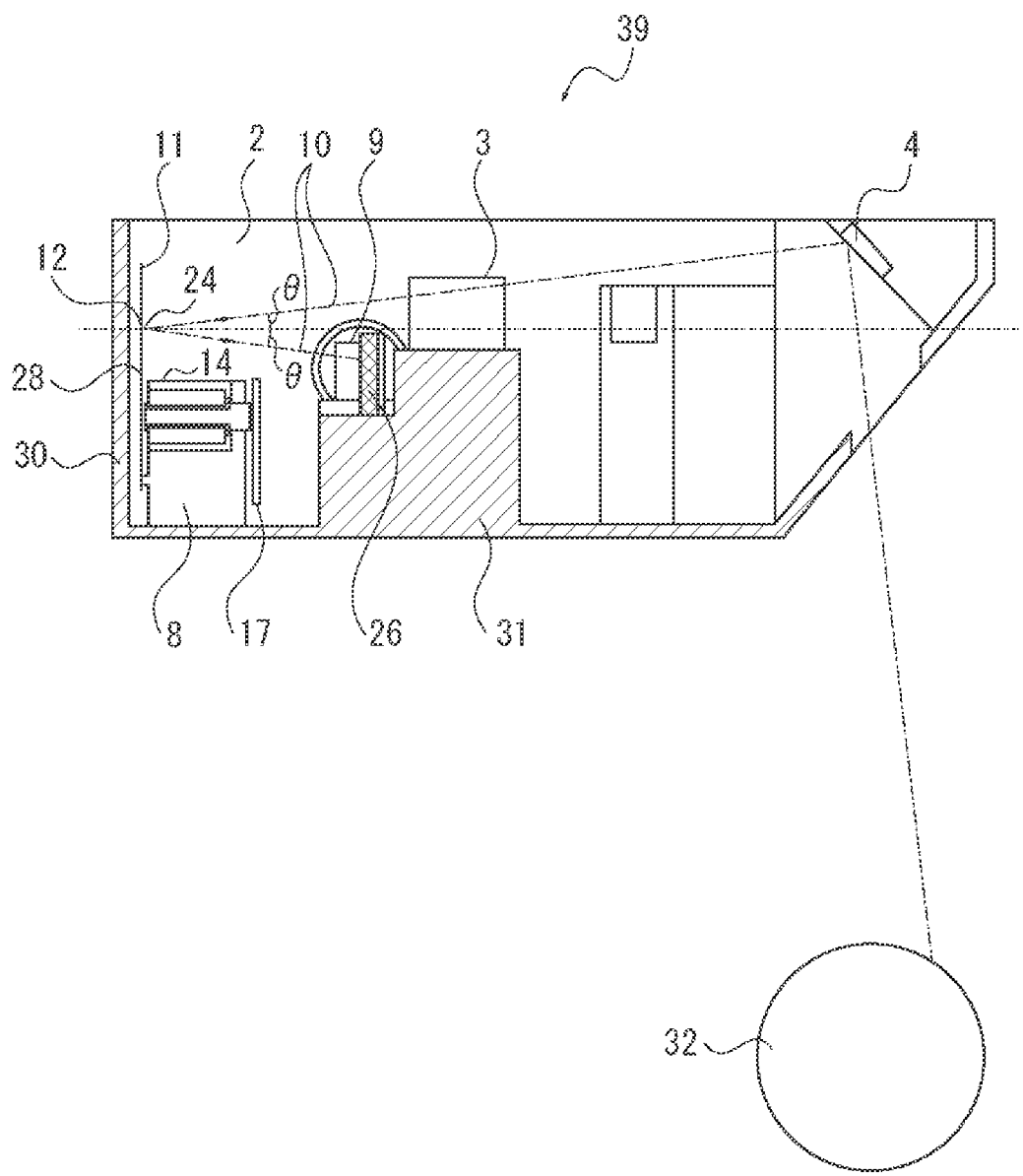
FIG. 5 is a schematic cross-sectional view illustrating the optical scanning apparatus according to the first exemplary embodiment of the present invention.

Next, the arrangement of the light deflection device 2 and the fθ-lens 3 is described below. FIG. 5 is a cross-sectional view of the optical scanning apparatus 39 taken along a plane including the optical axis of the laser beam incident on the reflection surface 24 in the sub-scanning direction (i.e., a cross-sectional view taken along line D-D shown in FIG. 1).

After the laser beam 10 exits the cylindrical lens 9, the traveling direction of the laser beam 10 is changed by the reflection mirror 26 travels above the actuator 14 and is incident on the reflection surface 24 of the movable element (reflection element) 12 of the plate member 11.

At that time, the laser beam 10 is obliquely incident upon the reflection surface 24 by an angle θ to a normal line to the reflection surface 24. Preferably, the angle θ is set to be as small as possible, e.g., about 3° in order to prevent occurrence of the nonuniform diameter of the beam-spot of the laser beam on the photosensitive drum 32 and the variation in the pitch thereof in the sub-scanning direction.

The laser beam 10 reflected by the reflection surface 24 is incident on the fθ-lens 3 by being inclined upward to the optical axis thereof by the angle θ. The reflection mirror 26, the actuator 14, and the circuit board 17 are arranged at positions that do not interrupt the laser beam 25.

The plate 11 is provided such that a rear surface 28 opposite to the reflection surface 24 faces an outer wall (side wall) 30 of the optical box 31.

According to the present embodiment, the actuator 14 is provided at a side at which the laser beam 10 is reflected (i.e., the side of the fθ-lens 3) with respect to the reference surface 24 of the plate member 11. As compared with a case where the actuator is provided at the side of the rear surface of the reflection surface of the plate member, the optical scanning apparatus can be reduced in size in a direction perpendicular to the reflection surface 24.

The image forming apparatus illustrated in FIG. 13 can be constructed by using the compact optical scanning apparatus described above such that the optical scanning apparatus is installed so as not to interfere with the locus of a process cartridge during the attachment/detachment of the process cartridge.

In addition, the image forming apparatus is configured such that the reflection surface 24 protrudes upward with respect to the actuator 14 in the sub-scanning direction. With this configuration, it is unnecessary to make the configuration of the actuator complex so that the laser beam can pass through the space among components of the actuator 14. The image forming apparatus can be constructed using the actuator of a simple configuration so as to prevent the laser beam undergoing the deflection scanning by the reflection surface 24 from interfering with the actuator.

In addition, according to the present exemplary embodiment, the rear surface 28 of the plate member 11 is placed close to the outer wall 30 of the optical box 31 so as to face the outer wall 30, and covered by the outer wall 30 thereof. This configuration has an advantage in preventing an assembly worker from accidentally touching and breaking the plate member 11 during assembly.

According to the present exemplary embodiment, the actuator (i.e., drive unit) 14 has the iron core 15 and the winding (coil) 16 wound around the iron core 15. The movable element (drive element) 13 of the plate member 11 located at a position, at which the movable element 13 faces the actuator 14, has the permanent magnet 20. In the case of the drive unit of such a configuration, it is unnecessary to provide a coil in the movable element (drive element) 13 and to supply electric power thereto from the outside. In other words, it is unnecessary to provide electric wiring in the plate member including a support element, the torsion spring, and the movable elements. Thus, the plate member can more easily be manufactured at low cost. However, the drive unit according to the present invention is not limited thereto.

That is, the drive unit can be constructed such that the movable element (drive element) 13 of the plate member 11 has a coil, and that the actuator arranged to face the drive element has a permanent magnet.

In other words, it is sufficient that a magnetic circuit is constructed by providing a part of the drive unit in the movable element (drive element) 13 and by proving the other part of the drive unit as the actuator arranged to face the drive element 13, and that the movable elements 12 and 13 of the plate member 11 can be driven by the magnetic circuit.

Figure 6:
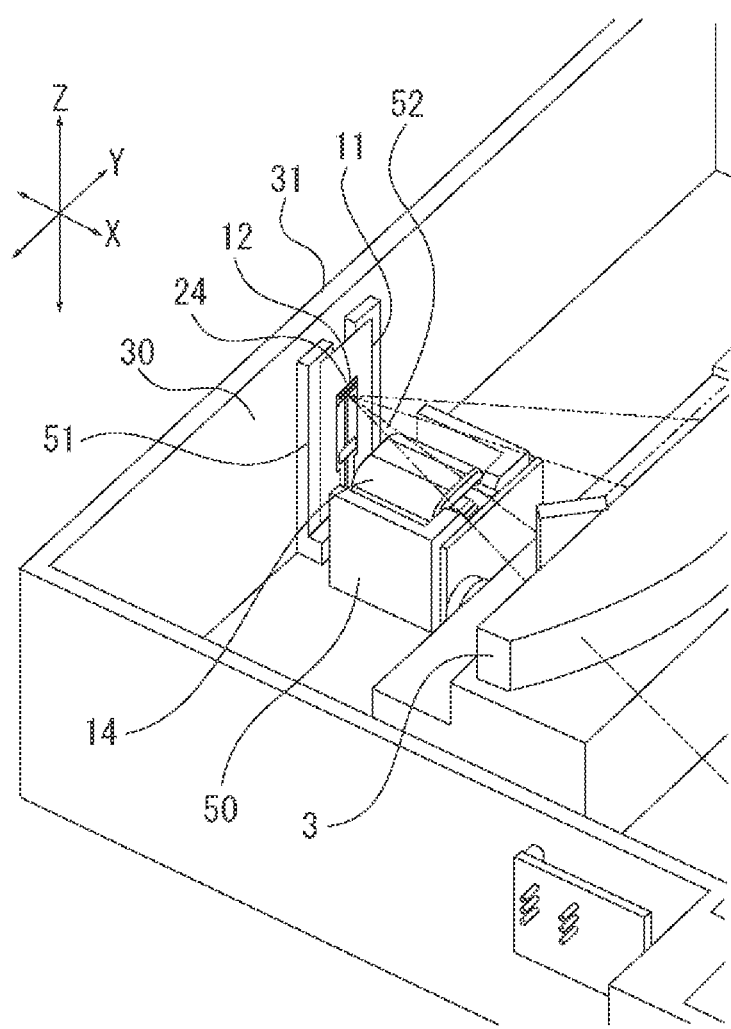
FIG. 6 is a partial perspective view illustrating an optical scanning apparatus according to a second exemplary embodiment of the present invention.

FIG. 6 illustrates an optical scanning apparatus according to a second exemplary embodiment of the present invention and is an enlarged perspective view illustrating the neighborhood of the plate member 11. According to the present exemplary embodiment, the plate member 11 is fixed to a mounting reference portion 51 provided with the outer wall 30 of the optical box 31.

The plate member 11, the actuator 14, the fθ-lens 3, and the like are housed in the resin optical box 31. An actuator holding portion 50 is provided integrally with the optical box 31. The mounting reference portion 51 for mounting the plate member 11 is formed integrally with the optical box 31.

Each of the actuator 14 and the plate member 11 is fixed to the optical box 31. The bar-like permanent magnet 20, which is fixed to the drive element of the plate member 11, and the actuator 14 are arranged so as to face each other and have a desired positional relation. The magnet 20 and the actuator 14 constitute a magnetic circuit. The rest of the configuration of the second exemplary embodiment is similar to the associated part of the configuration of the first exemplary embodiment. Thus, the detailed description thereof is omitted.

According to the present exemplary embodiment, the actuator 14 is provided at the side at which the laser beam 10 is reflected (i.e., the side of the fθ-lens 3) with respect to the reflection surface 24 of the plate member 11, similarly to the first exemplary embodiment. Thus, as compared with a case where the actuator is provided at the side of the rear surface of the reflection surface of the plate member, the optical scanning apparatus can be reduced in size in the direction (horizontal direction) perpendicular to the reflection surface 24.

In addition, according to the present exemplary embodiment, the plate member 11 is fixed to the mounting reference portion 51 provided on the outer wall 30 of the optical box 31. Thus, an assembly worker can be prevented from accidentally touching and breaking the plate member 11 during assembly.

In addition, according to the present exemplary embodiment, the plate member 11 is fixed directly to the optical box 31, similar to a group of optical elements such as the fθ-lens 3. Thus, the plate member 11 can be arranged with respect to the group of optical elements with relatively high precision, as compared with the first exemplary embodiment in which the plate member 11 is fixed to the optical box via the holder 8.

More specifically, reduction in optical performance due to the positional deviation (in X-, Y-, and Z-directions) of the plate member 11, the tilt thereof (rotation around Y-axis), the oscillation thereof (rotation around Z-axis), and the like can be suppressed. Accordingly, extremely high-quality images can be output.

Similarly, the deviation of the relative position of the laser beam 52 incident on the movable element (reflection element) 12 can be suppressed to a small value. Consequently, the area of the reflection surface 24, thus, the size of the plate member 11 can be reduced. In addition, the holder 8 used in the first exemplary embodiment is unnecessary. Accordingly, the number of components can be reduced. Consequently, a lower-cost optical scanning apparatus can be implemented.

Figure 7:
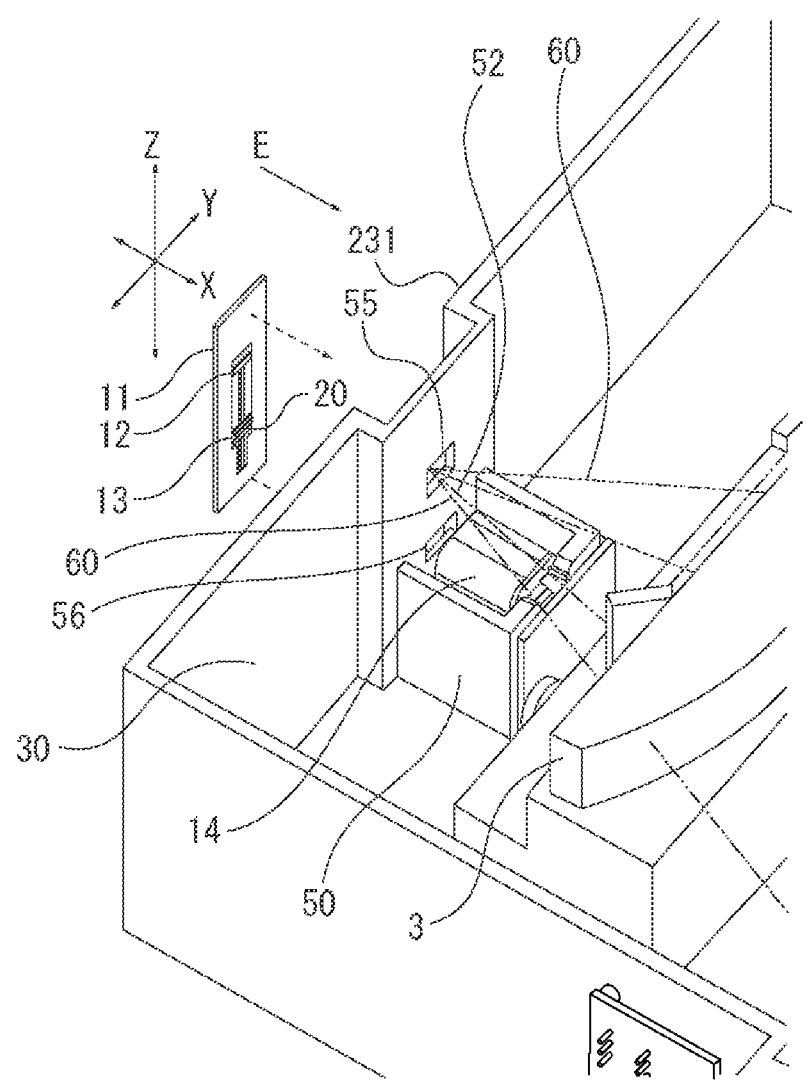
FIG. 7 is a partial perspective view illustrating the optical scanning apparatus according to a third exemplary embodiment of the present invention.
Figure 8:
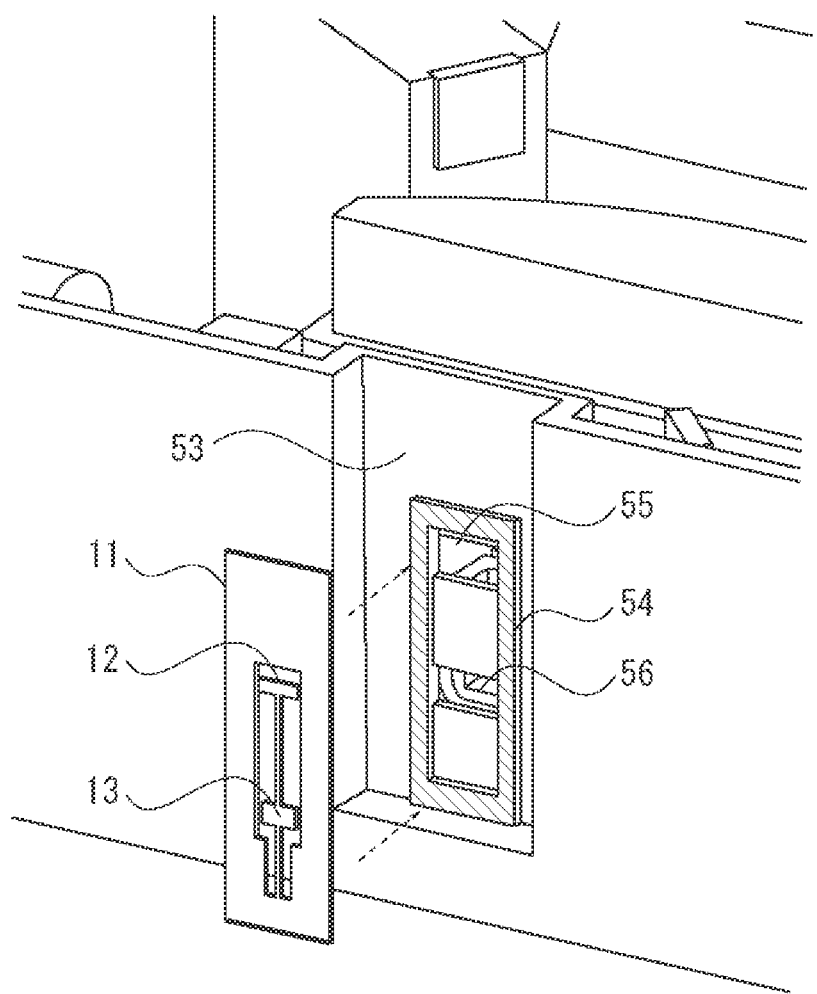
FIG. 8 is another partial perspective view illustrating an optical scanning apparatus according to the third exemplary embodiment of the present invention.

FIGS. 7 and 8 are perspective views illustrating an optical scanning apparatus according to a third exemplary embodiment of the present invention. FIG. 7 is an enlarged view illustrating the neighborhood of the plate member 11. FIG. 8 illustrates a method of mounting the plate member 11 and is taken in the direction of arrow E illustrated in FIG. 7. Both of FIGS. 7 and 8 illustrate a state of the apparatus before the plate member 11 is mounted in the optical box 231, for simply explaining the present exemplary embodiment.

In the present exemplary embodiment, a concave portion 53 for housing the plate member 11 attached thereto from the outside is provided in the outer wall 30 of the optical box 231. A mounting reference surface 54 for mounting the plate member 11 is formed on the concave portion 53.

The plate member 11 is fixed to the mounting reference surface 54 by a fixing means such as bonding. A window 55 for viewing the reflection element 12 inside the optical box, and another window 56 for exposing the permanent magnet 20 provided on the drive element 13 to the side of the actuator 14 are provided in the optical box 231. The other components of the present embodiment are similar to the associated ones of the first and second exemplary embodiments. Thus, the description of such components is omitted.

The window 55 has a necessary minimum size for preventing the laser beam 52 incident on the movable element (reflection element) 12 and reflected laser beam 60 from being interrupted, and for preventing the movable element (reflection element) 12 from touching the optical box 231 during vibration.

Similarly, the window 56 has a necessary minimum size for preventing the movable element (drive element) 13 from touching the optical box 231 during vibration. The window 56 is formed so that reduction in magnetic flux generated between the actuator 14 and the bar-like permanent magnet 20 does not affect the drive performance of the plate member 11.

Thus, the sizes of the windows 55 and 56 are elaborately set to reduce dust intruding into the optical scanning apparatus and leakage of acoustic noises.

According to the present exemplary embodiment, the actuator 14 is provided at the side at which the laser beam 10 is reflected (i.e., the side of the fθ-lens 3) with respect to the reference surface 24 of the plate member 11, similarly to the first and second exemplary embodiments. Thus, as compared with a case where the actuator is provided at the side of the rear surface of the reflection surface of the plate member, the optical scanning apparatus can be made compact in the direction (horizontal direction) parallel to the installation plane of the body of the optical scanning apparatus.

In addition, according to the present exemplary embodiment, the plate member 11 can be attached to the optical box from the outside of the optical box. Thus, the present exemplary embodiment has an advantage in further improving assembly workability, in addition to the advantages of the first and second exemplary embodiments.

Particularly, according to the present exemplary embodiment, when the position of the plate member 11 is adjusted and fixed with respect to the laser beam 52 incident on the reflection element and to the actuator 14, space outside the optical box can be utilized. Thus, for example, the range of movement of an adjustment device (not illustrated) can be expanded. Consequently, the present embodiment has an advantage in that the degree of flexibility in designing the optical scanning apparatus can be expanded.

This configuration of the optical scanning apparatus is very advantageous, for example, when the position of the plate member 11 is adjusted by cutting the plate member 11 using a laser after the plate member 11 is attached to the optical box. As a result, the plate member 11 can easily be adjusted and fixed with high accuracy. Thus, an extremely high performance optical scanning apparatus can be provided.

It is useful for preventing the breakage of the plate member to attach a protection cover to the optical box from the outside of the optical box. If necessary, the widows 55 and 56 can be covered by a member made of glass or the like. The shape of the mounting reference surface 54 for mounting the plate member 11 and a method of fixing the plate member 11 according to the present invention are not limited to those according to the present embodiment.

The light deflection device according to each of the above exemplary embodiments has the two movable elements. One of the movable elements functions as the reflection element. The other movable element functions as the drive element. The deflection scanning of the laser beam is performed using the two movable elements. According to a fourth exemplary embodiment of the present invention, the miniaturization of an optical scanning apparatus employing alight deflection device that has one movable element functioning as both of the reflection element and the drive element is described below.

Figure 9:
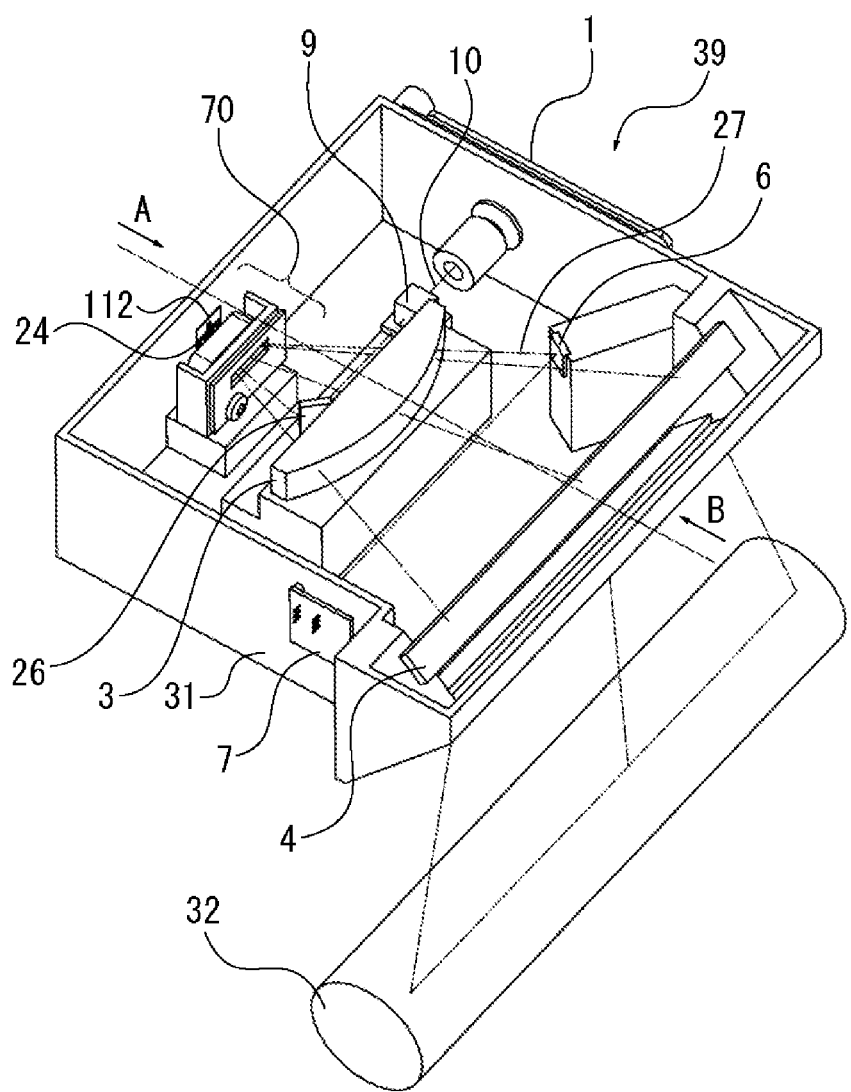
FIG. 9 is a partial perspective view illustrating an optical scanning apparatus according to a fourth exemplary embodiment of the present invention.
Figure 10A:
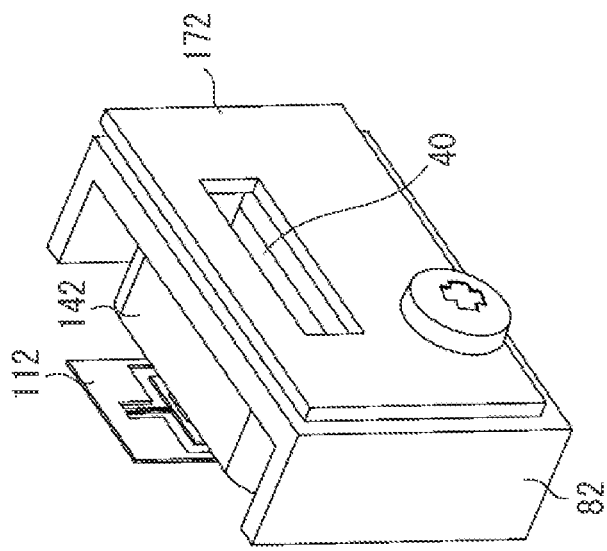
FIGS. 10A and 10B are partial perspective views illustrating a light deflection device according to the fourth exemplary embodiment of the present invention.
Figure 10B:
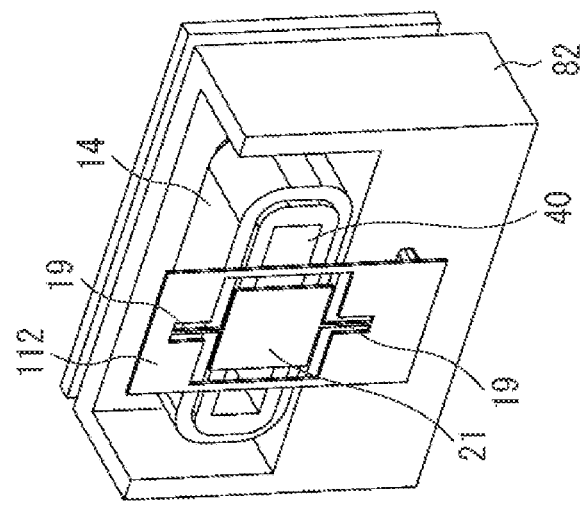
Figure 11:
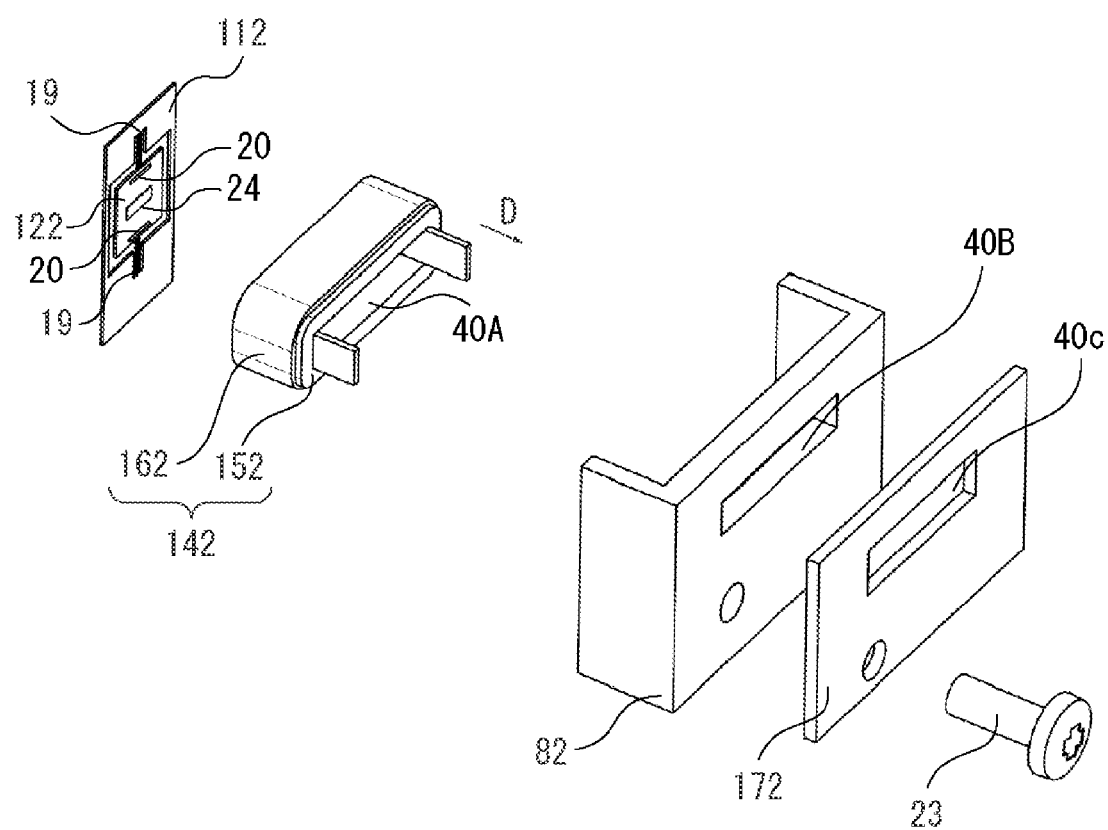
FIG. 11 is an exploded perspective view illustrating the light deflection device according to the fourth exemplary embodiment of the present invention.

FIG. 9 is a perspective view illustrating an optical scanning apparatus according to the fourth embodiment. FIGS. 10A and 10B illustrate a light deflection device 70. FIG. 10A is a view taken in the direction of arrow A illustrated in FIG. 9. FIG. 10B is a view taken in the direction of arrow B illustrated in FIG. 9. FIG. 11 is an exploded perspective view illustrating the light deflection device 70.

As illustrated in FIG. 11, in the present exemplary embodiment, a plate member as a movable device (deflection device) 112 has one movable element 122. The movable element 122 is connected to a support frame by two torsion springs 19. The reflection surface 24 is formed on the movable element 122. Thus, the movable element 122 functions as the reflection element.

In addition, the bar-like permanent magnets (drive portions) 20 respectively located upward and downward in a direction corresponding to the sub-scanning direction of the reflection surface 24 are fixed integrally to the movable element 122. The permanent magnets 20 function also as the drive elements. When the actuator for driving the movable element 122 of the plate member 112 by giving a driving force thereto is arranged at a side at which the laser beam 10 is reflected by the reflection surface 24 (i.e., the side of the fθ-lens 3) in the optical scanning apparatus having the movable elements 122, the laser beam 10 incident on the reflection surface 24 or the laser beam 10 deflected by the reflection surface 24 to scan the photosensitive drum 32 may be interrupted by the actuator.

First, the configuration of the light deflection device 70 according to the present exemplary embodiment is described below. An optical scanning actuator 142 includes an iron core 152 having an opening portion 40A, which the laser beam 10 passes through, and a winging (coil) 162 wound around the iron core 152. A holder 82 is provided with an opening portion 40B, which the laser beam 10 passes through.

The actuator 142 is inserted into the holder (holding member) 82 from the direction of arrow D illustrated in FIG. 11 and fit into the opening portion 40B of the holder 82. The actuator 142 is positioned at and fixed to the holder 82 so that the opening portions 40A and 40B overlap with each other.

A circuit board 172 for supplying electric power to the actuator 142 has an opening portion 40C. The circuit board 172 is fixed to the holder 82 via a screw 23 so that the opening portions 40C and 40B overlap with each other. The circuit board 172 is electrically connected to a control circuit (not illustrated) provided in an image forming apparatus. After the actuator 142 is fixed to the holder 82, the plate member as a movable device (deflection device) 112 is fixed to the holder 82 so that the reflection surface 24 is located at a position at which the reflection surface 24 faces the opening portion A.

Thus fabricated light deflection device 70 is configured such that the opening portions 40A, 40B and 40C overlap one another so as to form an opening portion 40 at a position at which the opening portion 40 faces the reflection surface 24.

Figure 12:
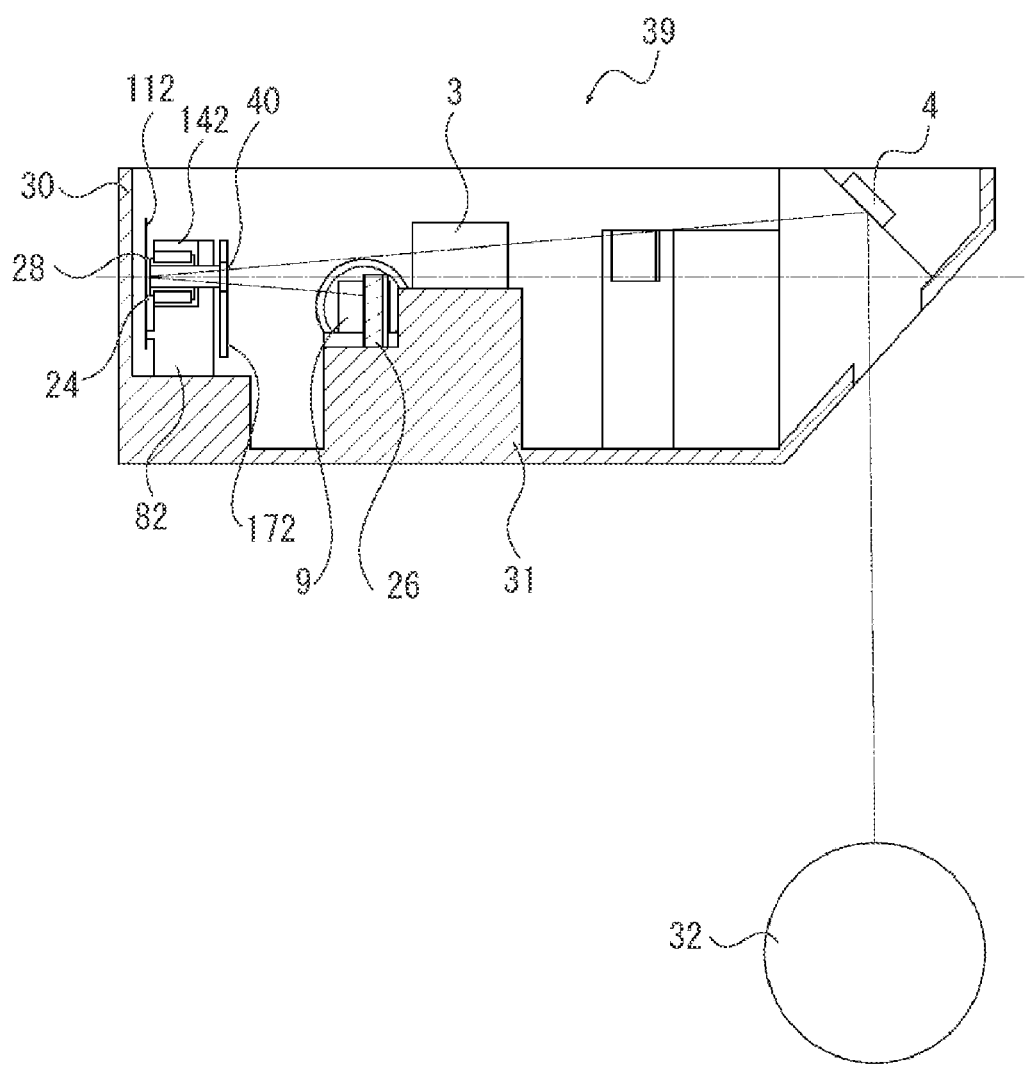
FIG. 12 is a schematic cross-sectional view illustrating the optical scanning apparatus according to the fourth exemplary embodiment of the present invention.

Next, the arrangement of the light deflection device 70 is described below. FIG. 12 is a cross-sectional view illustrating the optical scanning apparatus 39 equipped with the light deflection device 70, which is taken along a plane including the optical axis of the laser beam incident on the reflection surface 24. Similar to the first exemplary embodiment, the traveling direction of the laser beam 10 is changed by the reflection mirror 26 after the laser beam 10 exits the cylindrical lens 9, and then, the laser beam 10 passes through the opening portion 40 and is incident on the reflection surface 24 of the movable element 122 of the plate member 112.

At that time, the laser beam 10 is obliquely incident upon the reflection surface 24 by an angle of 3° with respect to the normal line to the reflection surface 24. The laser beam 10 is reflected by the reflection surface 24 in a state in which the traveling direction of the reflected laser beam 10 is inclined upward to the normal line by an angle of 3°. The reflected laser beam 10 passes through the opening portion 40 and is incident on the fθ-lens 3.

Next, the opening portion 40 of the light deflection device 70 is described below. The dimension in a direction corresponding to the main scanning direction of the opening portion 40 and that in a direction corresponding to the sub-scanning direction thereof are set so as not to interrupt an optical path of the laser beam 10 from the reflection mirror 26 to the reflection surface 24 and another optical path of the laser beam 10 deflected by the reflection surface 24, which is necessary to scan the photosensitive drum by the deflected laser beam 10. Because of the opening portion 40 provided in the optical scanning apparatus 70, the deflection scanning of the laser beam 10 on the photosensitive drum 32 can be performed without interrupting the laser beam 10 even when the actuator 142 is arranged at a side at which the laser beam 10 is reflected by the reflection surface 24.

Next, the driving of the light deflection device 70 is described below. The plate member 112 is a reciprocating-rotation movable device (deflection device) that has a rotation axis and a reflection surface and that performs the deflection scanning of the laser beam 10 by performing the reciprocating-rotation of the reflection surface around the rotation axis. A vibration system according to the fourth exemplary embodiment having only one movable element 122 like the plate member 112 differs from the first exemplary embodiment in that the vibration system according to the fourth exemplary embodiment does not have a natural vibration mode having the second natural frequency, which is twice the fundamental natural frequency. Thus, the movable element 122 cannot be vibrated by the superposition of the natural vibration modes respectively having the fundamental natural frequency and the second natural frequency to vibrate substantially at uniform angular velocity.

The amplitude angle θ(t) of the movable element 122 used to perform the deflection scanning of the laser beam shows behavior represented by the following expression.

$$\theta(t) = A_4 \sin(\omega t) + A_3$$

where $A_4$ is an amplitude corresponding to the fundamental natural frequency (of a fundamental wave), ω is the fundamental natural frequency, and $A_3$ is a static angular error (e.g., an angular error in the position of the movable element 122 when the movable element 122 does not vibrate).

Thus, the vibration angle of the movable element 122 is sinusoidally varied. Accordingly, the beam-spot of the laser beam 10 transmitted through the fθ-lens 3 is not moved on a surface of the photosensitive drum 32 in the main scanning direction at uniform velocity. Consequently, the intervals of the beam-spots of the scanning beam are not uniform.

Then, the intervals of moments, at each of which the laser beam 10 transmitted through the fθ-lens 3 is irradiated, are corrected in consideration of the vibration angle of the movable element 122 so that the intervals of the beam-spots of the scanning beam are uniform. Consequently, the deflection scanning of the laser beam 10 to be deflected by the reflection surface 24 can be performed as if the laser beam 10 were deflected using a movable element vibrating at uniform angular velocity.

Another method for solving the problem of the nonuniform velocity of the beam-spot is to employ, instead of the fθ-lens 3, what is called an arcsine lens for converting the laser beam 10, the angular velocity of which is sinusoidally varied, so that the beam-spot of the laser beam 10 is moved in the main scanning direction at uniform velocity on the surface of the photosensitive drum. Consequently, even when the intervals of moments, at each of which the laser beam 10 is irradiated, are not corrected, the deflection scanning of the laser beam 10 can be performed so that the beam-spot of the laser beam 10 is moved in the main scanning direction at uniform velocity on the surface of the photosensitive drum.

According to the present exemplary embodiment, the opening portion 40, through which the laser beam 10 passes, is provided in the light deflection device in which one movable element functions as both of the reflection element and the drive element. Thus, the actuator 142 can be arranged at the side at which the laser beam 10 is reflected (i.e., the side of the fθ-lens 3) with respect to the reference surface 24 of the plate member 112.

Accordingly, the rear surface 28 of the plate member 112 can be placed close to the outer wall 30 of the optical box 31 so as to face the outer wall 30. Thus, as compared with a case where the actuator is provided at the side of the rear surface of the reflection surface of the plate member, the optical scanning apparatus can be reduced in size in the direction perpendicular to the reflection surface 24.

In the foregoing description, it has been described that the actuator (drive unit) 142 includes the iron core 152 and the winding 162 wound around the iron core 152, and that the movable element 122 of the plate member 112 placed at a position, at which the movable element 122 faces the actuator 142, has the permanent magnet 20. When the drive unit of such a configuration is used, it is unnecessary to provide the coil in the movable element and to supply electric power thereto from the outside. That is, it is unnecessary to provide electric wiring in the plate member including the support element, the torsion springs, and the movable element. Consequently, the plate member can more easily be manufactured at low cost.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-000835 filed Jan. 6, 2009, which is hereby incorporated by reference herein in its entirety.

What is claimed is:

1. An optical scanning apparatus comprising:
a light source configured to emit a laser beam;
a movable device having a rotation axis and a reflection member on which a reflection surface is formed, wherein the laser beam is incident on the reflection surface, and the reflection member performs reciprocating-rotation around the rotation axis;
a coil that faces the reflection member and causes the reflection surface to perform the reciprocating-rotation;
a scanning lens configured to converge the laser beam reflected by the reflection surface on a surface to be scanned; and
an optical box configured to house the movable device, the coil, and the scanning lens,
wherein the coil is disposed only in a space between the scanning lens and the reflection member.

2. The optical scanning apparatus according to claim 1, wherein the movable device includes a drive portion configured to constitute a magnetic circuit with the coil for causing the reflection surface to perform the reciprocating-rotation, and
wherein the coil is disposed so as to face the drive portion and as not to interrupt an optical path of the laser beam incident on the reflection surface and that of the laser beam reflected by the reflection surface to scan the surface to be scanned.

3. The optical scanning apparatus according to claim 2, wherein the movable device includes a drive member on which the drive portion is formed, wherein the drive member and the reflection member are arranged in a direction of the rotation axis and connected by a torsion spring to each other, and the drive member performs the reciprocating-rotation.

4. The optical scanning apparatus according to claim 2, wherein the drive portion is formed on the reflection member.

5. The optical scanning apparatus according to claim 4, wherein the coil has an opening portion through which the laser beam incident on the reflection surface and the laser beam, which is reflected by the reflection surface to scan the scanned surface, pass.

6. The optical scanning apparatus according to claim 2, wherein the movable device is assembled to an outer wall of the optical box.

7. The optical scanning apparatus according to claim 6, wherein the movable device is mounted to the outer wall of the optical box from outside.

8. The optical scanning apparatus according to claim 7, wherein the movable device is assembled to a concave portion provided in the outer wall of the optical box.

9. The optical scanning apparatus according to claim 6, wherein the movable device is mounted to the outer wall of the optical box from inside.

10. The optical scanning apparatus according to claim 1, further comprising: an actuator including the coil, wherein the actuator is disposed on the space between the scanning lens and the reflection member.

11. An optical scanning apparatus comprising:
a light source configured to emit a laser beam;
a movable device having a rotation axis and a reflection member on which a reflection surface and a drive portion are formed,
wherein the laser beam is incident on the reflection surface, and the reflection member performs reciprocating-rotation around the rotation axis;
an actuator configured to constitute a magnetic circuit with the drive portion for causing the reflection member to perform the reciprocating rotation, the actuator being disposed to face the drive portion of the reflection member,
wherein the actuator is disposed so as not to interrupt an optical path of the laser beam incident on the reflection surface and that of the laser beam reflected by the reflection surface to scan the surface to be scanned;
a scanning lens configured to converge the laser beam reflected by the reflection surface on a surface to be scanned; and
an optical box configured to house the movable device, the actuator, and the scanning lens,
wherein the actuator is disposed between the reflection surface of the movable device and the scanning lens, and
wherein the actuator has an opening portion through which the laser beam incident on the reflection surface and the laser beam, which is reflected by the reflection surface to scan the scanned surface, pass.

12. An optical scanning apparatus comprising:
a light source configured to emit a laser beam;
a movable device having a rotation axis, a reflection member on which a reflection surface is formed and a drive portion,
wherein the laser beam is incident on the reflection surface, and the reflection member performs reciprocating-rotation around the rotation axis;
the actuator configured to constitute a magnetic circuit with the drive portion for causing the reflection member to perform the reciprocating rotation, the actuator being disposed to face the drive portion of the reflection member,
wherein the actuator is disposed so as not to interrupt an optical path of the laser beam incident on the reflection surface and that of the laser beam reflected by the reflection surface to scan the surface to be scanned;
a scanning lens configured to converge the laser beam reflected by the reflection surface on a surface to be scanned; and
an optical box configured to house the movable device, the actuator, and the scanning lens,
wherein the actuator is disposed between the reflection surface of the movable device and the scanning lens, and
wherein the movable device is assembled to an outer wall of the optical box.

13. The optical scanning apparatus according to claim 12, wherein the movable device is mounted to the outer wall of the optical box from outside.

14. The optical scanning apparatus according to claim 13, wherein the movable device is assembled to a concave portion provided in the outer wall of the optical box.

15. The optical scanning apparatus according to claim 12, wherein the movable device is mounted to the outer wall of the optical box from inside.

16. The optical scanning apparatus according to claim 12, wherein the movable device includes a drive member on which the drive portion is formed, wherein the drive member and the reflection member are arranged in a direction of the rotation axis and connected by a torsion spring to each other, and the drive member performs the reciprocating-rotation.

* * * * *